United States Patent [19]

Garrison

[11] Patent Number: 4,944,562

[45] Date of Patent: Jul. 31, 1990

[54] WIRE WHEEL HUB ADAPTER APPARATUS

[76] Inventor: Britt Garrison, P.O. Box 177, 818 Rose Ave., Morton, Pa. 19070

[21] Appl. No.: 310,931

[22] Filed: Feb. 16, 1989

[51] Int. Cl.$^5$ .............................................. B60B 27/06
[52] U.S. Cl. ................................... 301/111; 301/9 SC
[58] Field of Search ............ 301/9 AH, 9 CN, 9 AC, 301/105 R, 111, 112, 114, 124 R, 126, 130, 131, 132, 1, 9 SB, 9 SC, 38 R, 40 R, 109, 110, 115, 122, 135

[56] References Cited

U.S. PATENT DOCUMENTS

| | | | |
|---|---|---|---|
| 4,299,425 | 11/1981 | Renz et al. | 301/9 CN |
| 4,478,458 | 10/1984 | Flexman | 301/9 SB X |
| 4,533,184 | 8/1985 | Muller et al. | 301/65 X |
| 4,537,449 | 8/1985 | Hayashi | 301/9 CN |
| 4,828,328 | 5/1989 | Bowman | 301/111 X |

FOREIGN PATENT DOCUMENTS 411445 6/1934 United Kingdom ............ 301/9 SC
470655 8/1937 United Kingdom ............ 301/9 CN Primary Examiner—Russell D. Stormer
Attorney, Agent, or Firm—Leon Gilden

[57] ABSTRACT

A wire wheel hub adapter apparatus is set forth wherein a wire wheel formed with an internally splined hub securable by a threaded hub to an associated axle is adaptable to a conventional stud pattern of an associated wheel by use of the instant invention. The invention includes a central flange formed with a hollow axially aligned support hub formed with gradually increasing wall thickness to effect enhanced strength of the hub and ensure alignment of an associated extending axle. The extending axle includes a rearwardly positioned splined shaft for receiving the associated wire wheel at a forwardly distal end formed with externally threaded portion to receive the aforenoted locking hub.

1 Claim, 1 Drawing Sheet

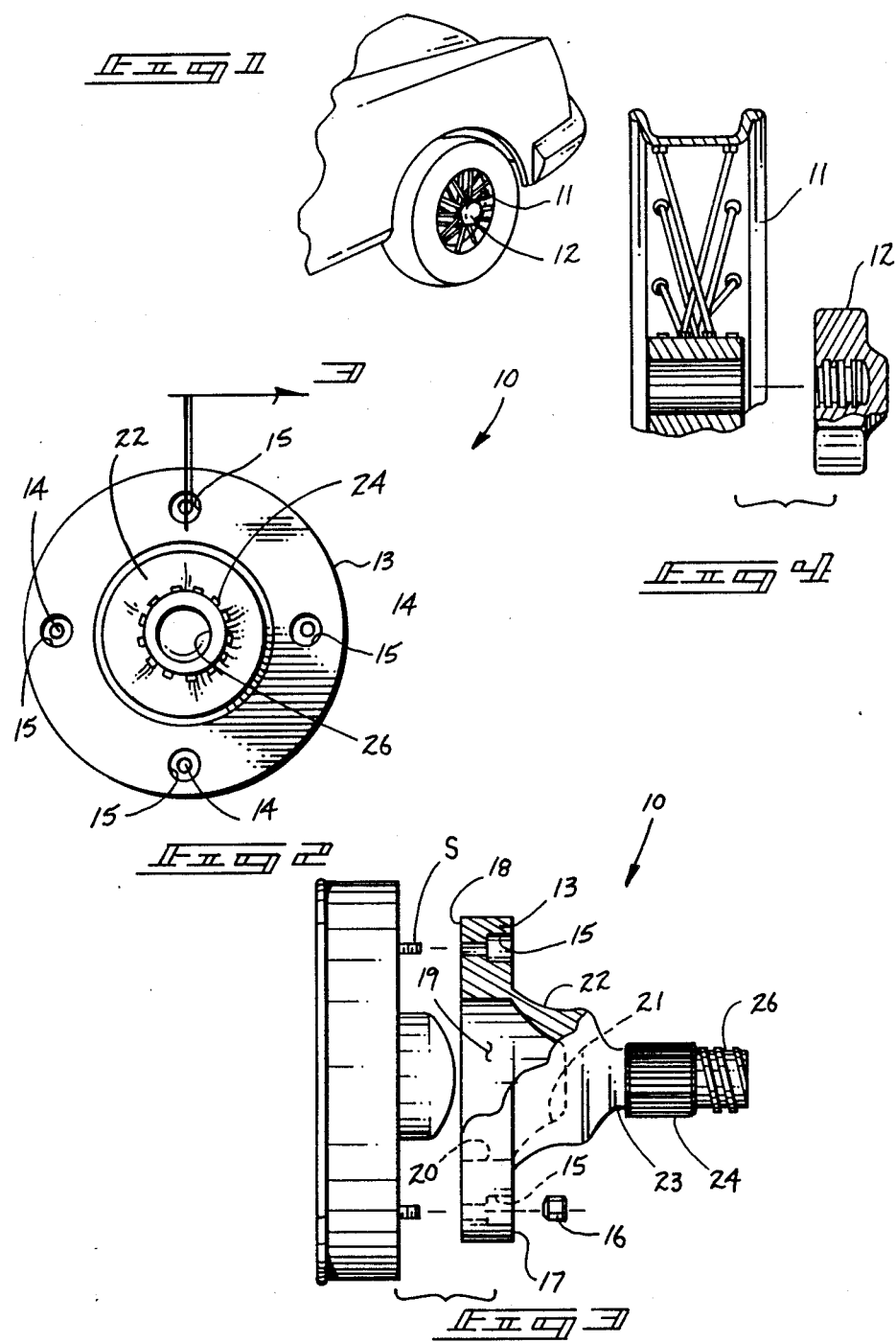

WIRE WHEEL HUB ADAPTER APPARATUS

BACKGROUND OF THE INVENTION

1. Field of the Invention

The field of invention relates to hub adapters, and more particularly pertains to a new and improved hub adapter wherein the same adapts the relatively plentiful wire wheels utilized in British-type sports cars to conventional bolt patterns of existing automobiles.

2. Description of the Prior Art

The use of various wheel adapters is known in the prior art. Wheel adapters of prior art have typically been utilized to accommodate specialized situations of adaption wherein the prior art has heretofore failed to accommodate the utilization of a plentiful supply of British-type wire wheels to existing automotive wheels. Utilized in particular the accommodation of a desirable "knock-off" type wheel. For example, U.S. Pat. No. 2,309,257 sets forth a wheel mounting apparatus for securing a wheel hub on a wheel box without priorly finishing the mating parts of the wheel box and hub to ensure assembly. Utilizing various curvilinear surfaces accommodating an alignment procedure to effect such accommodation. The Scarlett patent is of a relatively remote organization, but is of interest relative to the adaption of various wheel components.

U.S. Pat. No. 4,135,766 to Trautloff sets forth a flanged wheel mounting assembly securable onto a splined shaft. The Trautloff patent is of interest relative to the illustration of the utilization of spline interfitting parts to effect assembly of various wheel components.

U.S. Pat. No. 4,225,191 to Knoski sets forth a wheel assembly utilizing guide pins and the like with a wheel hub to maintain the wheel in alignment relative to the hub.

U.S. Pat. No. 4,376,554 to Schumacher utilizes a wheel formed of a plurality of wheel halves secured together including a threaded nipple for receiving a bearing with a threaded outer member for receiving a securement nut to secure the wheel to an associated axle.

U.S. Pat. No. 4,718,782 to Osborne sets forth a wheel adapter apparatus utilizing a stud receiving hub of a first pattern with outwardly extending studs of a second pattern to adapt an associated wheel to a desired misaligned stud pattern.

As such, it may be appreciated that there is a continuing need for a new and improved wheel hub adapter apparatus wherein the same addresses both the problems of effectiveness and compactness of organization, and in this respect, the present invention substantially fulfills this need.

SUMMARY OF THE INVENTION

In view of the foregoing disadvantages inherent in the known types of wheel hub adapter apparatus now present in the prior art, the present invention provides a wheel hub adapter apparatus compactly and effectively associating a "knock-off" type wire wheel to a conventional threaded wheel stud pattern. As such, the general purpose of the present invention, which will be described subsequently in greater detail, is to provide a new and improved wheel hub adapter apparatus which has all the advantages of the prior art wheel hub adapter apparatus and none of the disadvantages.

To attain this, the present invention comprises an annular flange formed with a pattern of through-extending bores extending to an outer surface wherein the outer surface includes counter-bored blind bores to accept wheel lugs to secure the studs to the flange. An axially aligned and outwardly extending hub is formed with a gradually increasing wall thickness to ensure strength and integrity to the apparatus and formed to receive an existing outwardly extending bearing cup from an associated and existing wheel receiving the apparatus. Outwardly extending shaft axially aligned and extending outwardly from the hub includes a rearwardly positioned splined shaft of a diameter greater than a forwardly positioned stub shaft formed with threads to receive a locking hub to secure the associated wire wheel thereto.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U S Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved wheel hub adapter apparatus which has all the advantages of the prior art wheel hub adapter apparatus and none of the disadvantages.

It is another object of the present invention to provide a new and improved wheel hub adapter apparatus which may be easily and efficiently manufactured and marketed.

It is a further object of the present invention to provide a new and improved wheel hub adapter apparatus which is of a durable and reliable construction.

An even further object of the present invention is to provide a new and improved wheel hub adapter apparatus which is susceptible of a low cost of manufacture with regard to both materials and labor and which accordingly is then susceptible of low prices of sale to the consuming public, thereby making such wheel hub adapter apparatus economically available to the buying public.

Still yet another object of the present invention is to provide a new and improved wheel hub adapter apparatus which provides in the apparatuses and methods of the prior art some of the advantages thereof, while simultaneously overcoming some of the disadvantages normally associated therewith.

Still another object of the present invention is to provide a new and improved wire wheel hub adapter apparatus wherein the same is provided to associate an existing mounting assembly on an automobile to accommodate a "knock-off" type wire wheel including a locking hub threadedly securing the wire wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a wire wheel accommodated by the instant invention.

FIG. 2 is an orthographic top view of the instant invention.

FIG. 3 is an orthographic side view taken in elevation of the instant invention, partially in section, illustrating the various parts, their configuration, and relationship.

FIG. 4 is an orthographic cross-sectional view taken partially in section of the internally splined wire wheel and associated locking hub for use in combination with the instant invention.

DESCRIPTION OF THE PREFERRED EMBODIMENT

With reference now to the drawings, and in particular to FIGS. 1 to 4 thereof, a new and improved wire wheel hub adapter apparatus embodying the principles and concepts of the present invention and generally designated by the reference numeral 10 will be described.

More specifically, the instant invention essentially comprises the wire wheel hub adapter apparatus 10 for use in securing a wire spoked wheel 11 and an internally threaded locking hub 12 of the "knock-off" type.

The adapter apparatus includes an annular flange 18 formed with a planar outer surface 17 and an inner planar surface 18 parallel to the outer surface. A plurality of through-extending apertures 14 are formed orthogonally through the annular flange 18 in a preselected pattern. While for purposes of illustration only four apertures 14 and associated blind counter-sunk bores 15 are illustrated, it should be understood that the invention accommodates variations such as a five-bore pattern in a 4.75 inch bolt circle utilizing 7 1/16th inch through-extending studs "S" as well as five through-extending apertures in a 4.5 inch circle accommodating ½ inch studs "S". The blind counter-sunk bores 15 are extending downwardly from the outer surface 17 and of a diameter greater than the through-extending apertures 14 to accommodate lug nuts 16 therewithin to appropriately center and secure the adapter to an associated brake drum or disk brake rotor assembly, as illustrated in FIG. 3 for example.

An inner cavity 19 extends interiorly from the inner surface 18 coaxially aligned with the flange 13 and an associated central hub 22. The inner cavity includes a cylindrical wall 20 and a substantially hemispherical recess 21 to accommodate an outwardly extending bearing cup, as illustrated in FIG. 3 for example. The central hub 22 is, as noted, axially aligned with cavity 19 and flange 13 and is formed with a web of increasing thickness extending from the flange 13 to an axle shaft 23 to ensure and enhance the strength and alignment of the associated axle shaft 28 to the flange 13 to accommodate mechanical stress in an automotive environment.

The axle shaft 23 of a first diameter includes an axially aligned splined shaft 24 of a second diameter greater than the diameter of the axle shaft 23 and formed with a beveled forward edge 25 to more readily accommodate and secure the wire spoke wheel 11 onto the spline shaft 24. The axle shaft 23 terminates in a threaded forward stub shaft 26 axially aligned with the axle shaft 23 and spline shaft 24 and formed with threads of a third diameter greater than that of the diameter of axle shaft 23 and less than the second diameter of the spline shaft 24 to receive the terminally threaded hub 12 thereon and secure the wire spoke wheel 11 onto the associated automobile.

As to the manner of usage and operation of the instant invention, the same should be apparent from the above description and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A wheel hub adapter apparatus for use in combination with a wheel wherein said wheel includes an internally splined hub mounted coaxially of the wheel and a separate internally threaded locking hub, said apparatus comprising, an annular flange means formed with a circular pattern of apertures for receiving threaded projecting studs extending outwardly from a brake assembly, and a central hub integrally formed to said annular flange formed with an internal cavity for receiving a bearing cup extending outwardly from said brake assembly, and an axle means extending outwardly and orthogonally relative to the central hub including a first and second shaft portion to receive said hub and locking hub respectively thereon, and wherein said annular flange means includes a planar outer surface parallel to a planar inner surface, and said apertures each include a blind bore extending from said outer surface towards an inner surface of a diameter greater than said apertures for accommodating locking nuts therewithin, and wherein said annular flange means, said central hub, and said axle means are in coaxial alignment with one another, and wherein said central hub includes a cylindrical wall and a generally hemispherical recess overlying said cylindrical wall for receiving said bearing cup, and wherein said central hub is formed with a gradually increasing wall thickness extending from said annular flange to said axle means to enhance the strength and rigidity of the apparatus, and wherein said axle means includes an axle shaft of a first diameter adjacent said central hub and integrally formed to said first shaft portion, said first shaft portion formed of a second diameter greater than said first diameter including circumferentially encompassing splines about said first shaft portion wherein said splines are formed with a forward beveled edge to enhance accommodation of the medial hub, and wherein said second shaft portion is coaxially aligned with said first shaft portion and integrally formed thereto including external threads for receiving said locking hub wherein said threads extend from said first shaft portion to a forwardmost terminal end of said second shaft portion.

* * * * *